INVENTORS
WILLIS S. HOBSON
JOHN T. GREGORY
MARVIN L. GARRISON
BY Cohn and Powell
ATTORNEYS

INVENTORS
WILLIS S. HOBSON
JOHN T. GREGORY
MARVIN L. GARRISON
BY *Cohn and Powell*
ATTORNEYS March 3, 1970 W. S. HOBSON ET AL 3,498,037
AUTOMATIC HEADER CONTROL MEANS
Filed July 20, 1965 5 Sheets-Sheet 3

INVENTORS
WILLIS S. HOBSON
JOHN T. GREGORY
MARVIN L. GARRISON
BY *Cohn and Powell*
ATTORNEYS INVENTORS
WILLIS S. HOBSON
JOHN T. GREGORY
MARVIN L. GARRISON
BY Cohn and Powell
ATTORNEYS

INVENTORS
WILLIS S. HOBSON
JOHN T. GREGORY
MARVIN L. GARRISON
BY Cohn and Powell
ATTORNEYS United States Patent Office 3,498,037
Patented Mar. 3, 1970

3,498,037
AUTOMATIC HEADER CONTROL MEANS
Willis S. Hobson, John T. Gregory, and Marvin L. Garrison, Seymour, Ind., assignors to Seymour Manufacturing Co., Seymour, Ind., a corporation of Delaware
Filed July 20, 1965, Ser. No. 473,385
Int. Cl. A01d 67/00; F16k 31/18
U.S. Cl. 56—210                                10 Claims

ABSTRACT OF THE DISCLOSURE

The header control means includes a meter valve regulating the fluid supply to a ram operatively attached to the header. The meter valve includes a body portion, having a chamber in communication with first, second and third ports. A poppet valve regulates flow into the chamber and a metering plunger in the chamber regulates flow from the chamber through the second and third ports. A compartment is provided at the side of plunger remote from the chamber, and a bleed passage through the plunger communicates between the chamber and the compartment. A dump passage is provided between the compartment and the second port, and a sensing valve regulates flow through the dump passage. The header is coupled to the sensing valve, and as the header rises and falls, the sensing valve is operated to provide automatic pressure control to the ram, whereby to maintain the header at a predetermined height.

---

This invention relates generally to improvements in an automatic header control means, and more particularly to an automatic control for regulating the effective cutting height of the cutting head grain table of a combine.

Certain features of the present disclosure are described and claimed in U.S. Patent No. 3,088,264 entitled "Automatic Header Control Means" and issued May 7, 1963 to the common assignee.

In utilizing a combine for the harvesting of many crops, it is important to maintain the cutting head as close to the ground as possible in order to assure maximum yield. At the same time it is also important to avoid running the cutters into the ground so that the head will not pick up dirt and stones along with the seed-bearing material and so that the cutters are not damaged.

It is with low-lying crops, as for example soy beans, lespedezda and the like and harvesting grains and other seed crops which have been beaten down by storm so that their seed-bearing heads lie close to the ground, that an accurately low cutting height is most important, since upstanding grain crops can be effectively cut as much as a foot or more above the ground, thus making variation in the ground contour immaterial. Before the improvements of U.S. Patent No. 3,088,264, many combines were provided with power operated units for adjusting the height of the cutting head, but these units presented practical difficulties in control since the adjustment was made by the operator of the combine who gauged by eye the proper height for the existing ground conditions as the harvesting proceeded. It is not easy for the operator to gauge the ground level accurately, in view of the fact that it is covered by the crop being cut so that the variations in ground levels are concealed.

Certainly, the operator does not desire to run the cutters into the ground because of the possibility of damaging or contaminating the harvest by including dirt, and because of the loss of time involved while the operator is cleaning out the machine, and because of the possible breakage of the cutter blade. Accordingly, it is common practice to avoid these hazards by operating at a greater height than would otherwise be desirable in spite of the resulting loss in the harvest.

An important object of the present invention is to provide an automatic control for a combine which will regulate the cutting height of the cutting head, the control being adjustable to establish the cutting head at a desired minimum height for any given crop and ground condition, and being effective to maintain this pre-set established height by automatic regulation to compensate for changes in ground contour without further attention on the part of the operator.

Another important object is realized by the provision of a metering valve apparatus of the type described previously which includes a first valve means including a piston in the body chamber, means providing a bleed passage communicating the chamber at opposite sides of the piston, means providing a dump passage communicating with the chamber at one side of the piston and receiving flow from the bleed passage, and a sensing valve regulating flow through the dump passage, the sensing valve operating hydraulically to position the first valve means to regulate flow between first and second valve ports incident to maintaining the combine head at a predetermined height.

It is an important object to provide a metering valve apparatus that will accommodate pumps within a greater range of full capacities than that possible with other known control valves. For example, the pumps in the present systems used in combines will have flow rates varying from two gallons per minute to fifteen gallons per minute. Because there is no mechanical cable or connection that would limit the extent of movement of the plunger in adjusting the position of such plunger in the valve apparatus and because such positioning is done hydraulically with a sensing valve, a single valve construction in the system will accommodate the flow rates of pumps in any of the existing systems from at least two gallons per minute to fifteen gallons per minute.

An important object is to provide a resilient means in the valve apparatus tending to urge the first valve means toward the valve seat between the first and second ports in the valve body, the resilient means assuring closure of the first valve means upon stoppage of pressure flow through the first port. The first valve means must be closed in order to have a pressure build-up in the valve chamber upon the introduction of pressure flow through the first port.

Another important object is realized by the structural arrangement of providing a bleed passage through the plunger that communicates the chamber at the same side of the main valve seat as the first port with a compartment at one side of the plunger piston, the bleed passage serving to equalize the pressure on opposite sides of the plunger with a short delayed time action.

Another important object is attained by the provision of a by-pass passage in the valve body interconnecting the first port with the second port and by-passing flow about the main valve seat, and by the provision of a by-pass valve in the by-pass passage closing the passage yet opening upon excess pressure in the first port caused by unintentional closure of the main valve means on the main valve seat, thereby precluding unintentional and continuous raising of the combine head under pressure.

Still another important object is provided by the fact that the sensing unit may be attached directly to the metering valve body or may be maintained separate from such metering valve body and still operate hydraulically to regulate the flow to and from the hydraulic ram by positioning the valve plunger solely by means of hydraulic pressure. If the sensing unit is separate from the metering valve body, it is attached directly to the metering valve and to the dump line of the system by external lines.

An important object is afforded by the provision of a dump passage that includes a small metering hole, and by a spool valve oscillatively mounted in the valve body for opening and closing the metering hole to regulate flow through the dump passage. Because the metering hole is small, very little force is required to oscillate the spool valve and thereby regulate flow through such hole, thereby providing a valve apparatus that has the advantage of easy operation.

Another important object is achieved by the fact that means are connectable to one end of the spool valve for oscillating the spool valve to open or close the metering hole, the spool valve being reversible endwise so that this means oscillates the spool valve in opposite directions respectively to open or close the metering hole, thereby providing a choice in mounting the system on the combine frame.

It is an important objective to provide a switching valve, such as a four-way valve, connected to the first and second ports of the metering valve, the switching valve selectively connecting the feed and dump lines with either the first or second ports of a metering valve of the type mentioned previously, in which event, the means providing the dump passage connected with the chamber at one side of the plunger piston and receiving flow from the bleed passage is connected to the dump line.

In some constructions, the last said means provides an internal dump passage portion in the sensing unit connected with the compartment at one side of the plunger piston and provides an external dump passage portion connecting the internal dump passage portion to the dump line.

An important objective is to provide a metering valve and automatic header control system that are simple and durable in construction, economical to manufacture and assemble, and efficient in operation.

The foregoing and numerous other objects and advantages of this invention will more clearly appear from the following detailed description of several embodiments of the metering valve and of the system in which it is utilized, particlularly when considered in connection with the accompanying drawings, in which:

Figure 2:
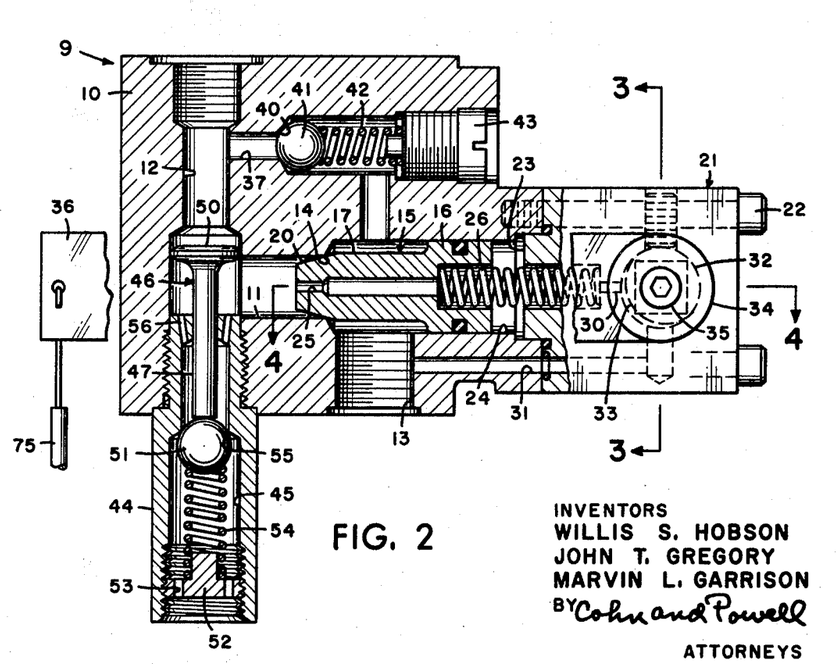
FIG. 2 is an enlarged cross sectional view of the metering valve utilized in the system of FIG. 1.
Figure 3:
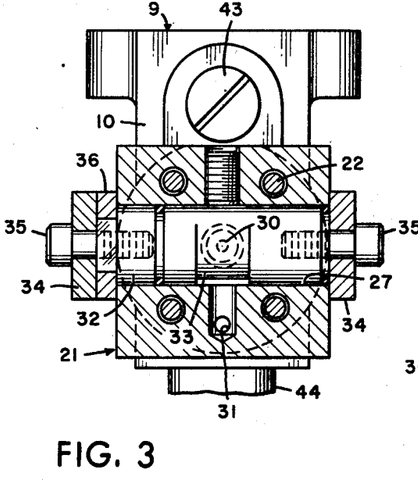
FIG. 3 is a cross sectional view as seen along line 3—3 of FIG. 2.
Figures 4, 5:
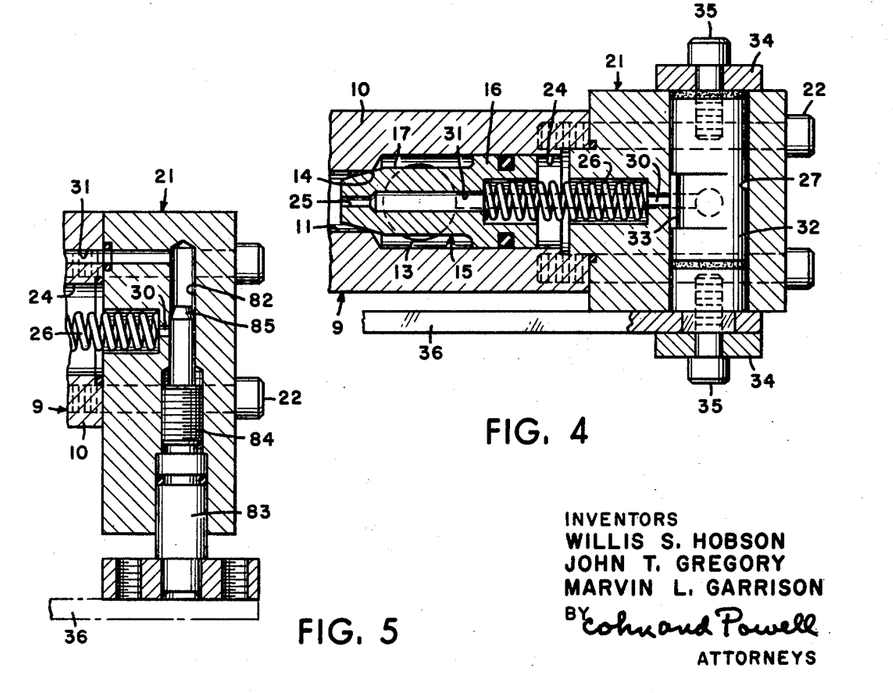
FIG. 4 is a cross sectional view as seen along line 4—4 of FIG. 2.
FIG. 5 is a fragmentary, cross sectional view of the sensing unit illustrating a modification of the sensing valve.

Referring now by characters of reference to the drawings, and first to FIGS. 2–4 inclusive, it is seen that the metering valve includes a valve body 10 including a chamber 11 formed therein, the chamber 11 being open at one end of body 10. Formed in body 10 is a first port 12 communicating with chamber 11. A cooperating second port 13 is formed in body 10 in spaced relation to the first port 12, the second port 13 communicating with chamber 11 toward its open end.

Located in chamber 11 at one side of second port 13 and located between the first and second ports 12 and 13 is a valve seat 14. A plunger 15 is reciprocatively mounted in chamber 11. The plunger 15 includes a piston 16 sliding within the chamber 11 at the opposite side of the second port 13. The plunger includes a reduced valve member 17 formed integrally with the piston 16, the valve member 17 extending across the second port 13 into operative relation with the valve seat 14. The valve member 17 includes a tapered forward end 20 that is adapted to move toward or away from the valve seat 14 upon reciprocation of the plunger 15 to regulate the flow between the first and second ports 12 and 13.

A sensing unit 21 is attached to body 10 by screws 22, the sensing unit 21 including a partition 23 closing the open end of body chamber 11 to form a compartment 24 at one side of the piston 16. For reasons which will later appear, the plunger 15 is provided with a restricted bleed passage 25 along its longitudinal axis and interconnecting that portion of the chamber on the same side of the valve seat 14 as the first port 12 with the compartment 24. A compression spring 26 is located in the compartment 24, one end of spring 26 engaging the partition 23 and the other end engaging the piston 16, the spring 26 tending to urge the valve member 17 in a direction toward its associated valve seat 14.

Formed transversely through the sensing unit 21 is a cylindrical bore 27. A small metering hole 30 through the partition 23 interconnects and communicates the compartment 24 with the bore 27, the metering hole 30 constituting a dump passage portion. An internal dump passage portion 31 through the sensing unit 21 and the valve body 10 interconnects and communicates the second port 13 with the bore 27. The hole 30, the bore 27 and the internal passage 31 combine to form and constitute the internal dump passage.

Oscillatively mounted in the bore 27 is a spool valve 32, the periphery of the spool valve 32 being provided with a recess 33 selectively alignable with both the metering hole 30 and the internal passage 31 upon oscillation of the spool valve 32. The ends of the spool 32 are mounted to the sides of the sensing unit 21 by washers 34 and fastening screws 35. An actuating arm 36 is fixed to one end of the spool 32 to oscillate such valve. Upon movement of the spool valve 32 in one direction, the periphery of such valve will close the metering hole 30, and upon oscillation in the other direction, the recess 33 will open the metering hole 30 and thereby open the dump passage.

It will be apparent that the spool valve 32 can be reversed end to end so that the arm 36 can oscillate the spool valve 32 in the opposite directions respectively from those mentioned above in order to close or open the metering hole 30.

Formed internally of the valve body 10 is a by-pass passage 37 interconnecting the first port 12 with the chamber 11 on the same side of the valve seat 14 as the second port 13. The by-pass passage 37 includes a valve seat 40 closed by a check ball valve 41. A compression spring 42 urges the ball valve 41 against its valve seat 40. An adjustable plug 43 is threadedly connected to the valve body 10 and engages one end of spring 42 whereby to adjust the closing pressure on the ball valve 41. During normal operation of the metering valve, the check ball valve 41 closes the by-pass passage 37 by seating on the valve seat 40. However, if for any reason, the valve member 17 of the plunger 15 becomes jammed on or closes permanently with its valve seat 14, there is a possibility of damage to the control system upon application of pressure through the first port 12. Under these circumstances, upon a predetermined pressure in the first port 12, the ball valve 41 will open so that the flow from the first port 12 will by-pass the valve seat 14 and move through the by-pass passage 37 for discharge through the second port 13.

Threadedly attached to the valve body 10 directly opposite the first port 12 is a tubular casing 44 that constitutes a part of body 10. The casing 44 provides a third port 45 that communicates with the chamber 11, the third port 45 being directly aligned with the first port 12 and being located on the same side of the valve seat 14 as the first port 12, and being located between the first port 12 and the valve seat 14 when considering the flow from the first port 12 to the second port 13.

Reciprocatively mounted in the reduced end of casing 44 is a poppet valve 46. The poppet valve 46 includes a stem 47 that extends into the casing 44 and hence into the third port 45, and which extends into and across the chamber 11. The poppet valve 46 includees a head 50 adapted to open and close the first port 12. The head 50 opens the first port 12 under pressure of flow into the first port 12.

A ball valve 51 is resiliently mounted within the casing 44. An adjustable plug 52 is threadedly connected internally of the casing 44, the plug 52 being provided with openings 53 communicating with the third port 45. A compression spring 54 is mounted within the casing 44 between the ball valve 51 and plug 52, the spring 54 tending to urge the ball valve 51 against its valve seat 55 to close the third port 45.

When the poppet valve 46 is moved inwardly of the casing 44 upon opening of the first port 12, the stem 47 engages the ball valve 51 and moves the ball valve 51 away from the valve seat 55. The third port 45 receives flow after passage into and through the first port 12, the ball valve 51 under the loading of the spring 54 maintains the poppet valve 46 in position so that the head 50 of such poppet valve is located substantially midway in the chamber 11. A plurality of passages 56 are formed in the front end of casing 44 immediately adjacent the periphery of the stem 47 of poppet valve 46 to provide direct communication of the third port 45 with chamber 11.

Figure 1:
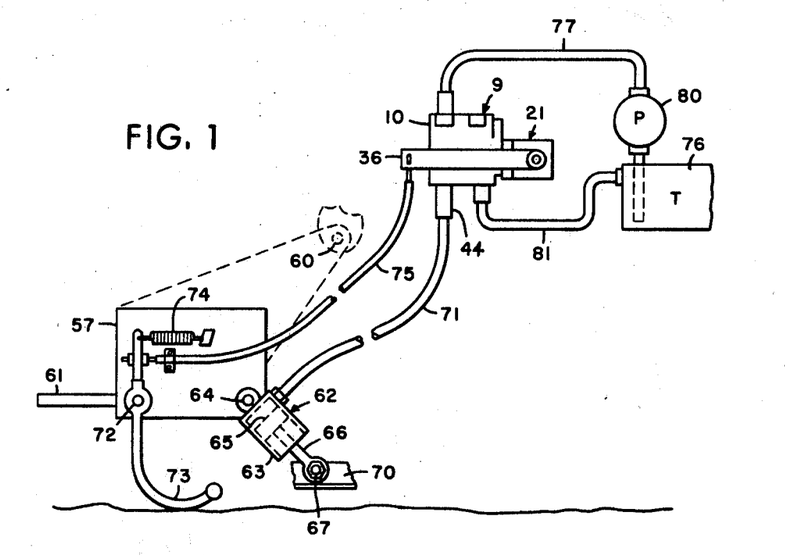
FIG. 1 is a diagrammatic view of the apparatus for controlling the height of a cutting head in a combine.

The metering valve of FIGS. 2-4 is utilized in the apparatus of FIG. 1. This apparatus includes a cutting head 57 of a combine adapted for movement in an up or down direction. The head 57 is shown pivotally mounted to the frame of the combine about pivot point 60. The head 57 includes cutting blades 61 diagrammatically illustrated. The adjustment of the head 57 in an up or down direction regulates the height of the cutting blades 61. This general type of combine is shown in U.S. Patent Nos. 2,589,553, 2,750,727 and 2,842,925.

A one-way ram 62 is operatively connected to the head 57 and is adapted to raise such head 57 under the action of applied hydraulic force. The ram 62 includes a cylinder 63 pivotally connected at one end by a pin 64 to the head 57 and includes a piston 65 having its rod 66 connected by a pin 67 to a frame member 70 of the combine. A fluid line 71 interconnects the ram 62 with the casing 44 and therefore with the third port 45. Fluid pressure can be exerted in the ram 62 through the fluid line 71, and hence cause elevation of the cutting head 57. Because the cutting head 57 moves in an arc, the ram 62 will pivotally adjust its position on pins 64 and 67 to accommodate any adjusted height position of head 57.

Pivotally mounted on pins 72 on the cutting head 57 are a plurality of feelers 73, one of which is shown in FIG. 1, adapted to engage the ground and determine any variation of ground contour below the head 57 for the entire width of such head. A spring 74 is operatively connected to the feelers 73 and tends to urge the feelers 73 downwardly into contact with the ground.

The metering valve body 10 is mounted to the combine frame. A linkage consisting of a flexible control cable 75 connects the feelers 73 to the end of actuating arm 36. Upon lowering the head 57, the feelers 73 will engage the ground and be rotated in a counterclockwise direction (FIG. 1) against the loading of spring 74, thereby pulling cable 75 to cause a corresponding counterclockwise rotation of actuating arm 36. The arm 36 will turn the spool valve 32 in a direction to close the metering hole 30 so that pressure will build up in the compartment 24 and move the plunger 15 toward the valve seat 14. Conversely, upon raising the head 57, the feelers 73 will be rotated clockwise under loading of spring 74, thereby pushing the cable 75 to cause a corresponding clockwise rotation of actuating arm 36. As the arm 36 moves, the spool valve 32 is turned in the opposite direction so that its recess 33 opens the metering hole 30 and thereby opens the dump passage to reduce the pressure in the compartment 24 and allow the plunger 15 to move away from the valve seat 14 to cause increased flow from the first port 12 through the second port 13.

Movement of the feelers 73 is transmitted by the control cable 75 to the actuating arm 36, whereby to turn the spool valve 32 in a direction depending upon the direction of pivotal movement of feelers 73. As discussed previously, the turning of the spool valve 32 will operate to position the plunger 15. The position of the plunger 15 is determined by the position of feelers 73, and consequently, the amount of flow between the first and second ports 12 and 13 is determined by the position of feelers 73.

The hydraulic system of FIG. 1 includes a reservoir 76 having a feed line 77 connected to the first port 12. A pump 80 is connected in the feed line 77 to supply fluid under pressure. A dump line 81 interconnects the second port 13 with the reservoir 76.

The operation of the metering valve 10 (FIGS. 2-4) and its system (FIG. 1) will be briefly described. First it will be assumed that the hydraulic pressure is turned off. In this event, the fluid pressure existing in the ram 62 and in the fluid line 71 causes the ball valve 51 to contact its valve seat 55 and close the third port 45, thereby maintaining the cutting head 57 in a stationary position.

Moreover, the plunger 15 is moved in a direction under the action of spring 26 so that the valve member 17 engages its valve seat 14 to close the flow passage between the first and second ports 12 and 13.

When the hydraulic pressure is turned on, fluid under pressure is introduced through the first port 12 causing the poppet valve 46 to unseat. As the poppet valve 46 opens the first port 12, the stem 47 engages the ball valve 51 and opens the third port 45. Because the valve seat 14 is closed by the valve member 17, pressure will build up in the chamber 11 and force the plunger 15 to move in a direction to unseat the valve member 17 from seat 14, and thereby open the passage between the first and second ports 12 and 13. The bulk of the fluid under pressure passing into the chamber 11 flows from the first port 12 past the valve member 17 and out of the second port 13, and back into the reservoir 76 through the dump line 81. Because the ball valve 51 is open, fluid can flow through the third port 45.

Simultaneously, fluid is flowing through the small bleed passage 25 and into the compartment 24 at one side of piston 16. Because the cutting head 57 is raised, the feelers 73 are rotated in a position so that the control cable 75 has moved the actuating arm 36 in a direction whereby the spool valve 32 is turned to a position in which its recess 33 opens the metering hole 30 and opens the internal dump passage communicating the compartment 24 with the second port 13. Consequently, the pressure in the compartment 24 is reduced to allow the plunger 15 to move in the direction in which the valve member 17 unseats from its valve seat 14.

The cutting head 57 drops under gravity to a predetermined height above the ground. As the cutting head 57 approaches this predetermined height position, the feelers 73 engaging the ground operate through the control cable 75 to swing the actuating arm 36 in a direction to turn the spool valve 32 to a position in which the spool valve 32 closes the metering hole 30, and thereby closes the internal dump passage interconnecting the compartment 24 with the second port 13. When the metering hole 30 is closed, the fluid moving through the bleed passage 25 will build up a pressure within the compartment 24 and create a force on the one side of the piston 16 which cooperates with the loading of spring 26 to move the plunger 15 in a direction to move the valve member 17 toward its valve seat 14, thereby reducing the flow of fluid out of the second port 13 and consequently channelling more of the fluid flow through the third port 45 so that the ram 62 lifts the head 57.

As the cutting head 57 is raised, the feelers 73 engaging the ground will rotate and act through the control cable 75 and actuating arm 36 to turn the spool valve in the opposite direction whereby the spool recess 33 will again open the metering hole 30 in order to allow the fluid in compartment 24 to be exhausted directly to the second port 13 through the internal dump passage. Because the pressure in compartment 24 is reduced the plunger will move in a direction so that the valve member 17 moves away from its valve seat 14. This action of plunger 15 causes more of the fluid to pass from the first port 12 to the second port 13 and thereby causes a pressure drop in the chamber 11. Fluid in the ram 62 and the fluid line 71 then flows through the third port 45 into the chamber 11, thereby causing the head 57 to lower.

FIG. 5 illustrates a modified sensing valve construction. In this embodiment, the sensing unit 21 is provided with an incomplete, stepped diameter bore 82. The metering hole 30 communicates with the bore 82 through one side. The internal dump passage portion 31 interconnects the second port 13 with the bore 82 as described previously with the embodiment of FIGS. 2–4.

The sensing valve consists of a stem 83 of stepped diameter disposed within the compatible bore 82. This valve stem 83 includes a threaded stem portion 84 threadedly engaging the sensing unit 21, and includes a reduced end portion 85 adapted to open and close the metering hole 30 upon longitudinal threaded adjustment of the valve stem 83. The outer end of valve stem 83 is attached to the actuating arm 36. As described previously, the actuating arm 36 turns the valve stem 83 in the direction required to open or close the metering hole 30 to provide the function and operation explained previously.

Figure 6:
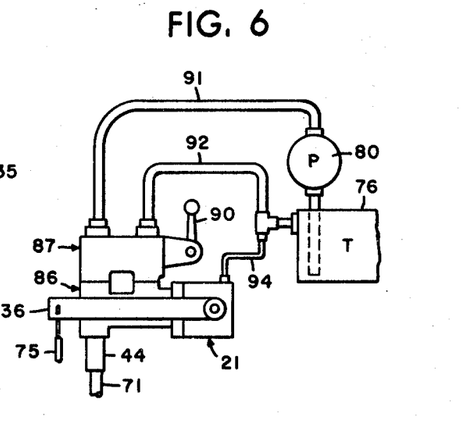
FIG. 6 is a diagrammatic view of the system utilizing a modified metering valve with an associated 4-way valve and an external dump passage from the sensing unit.
Figures 7, 8, 9:
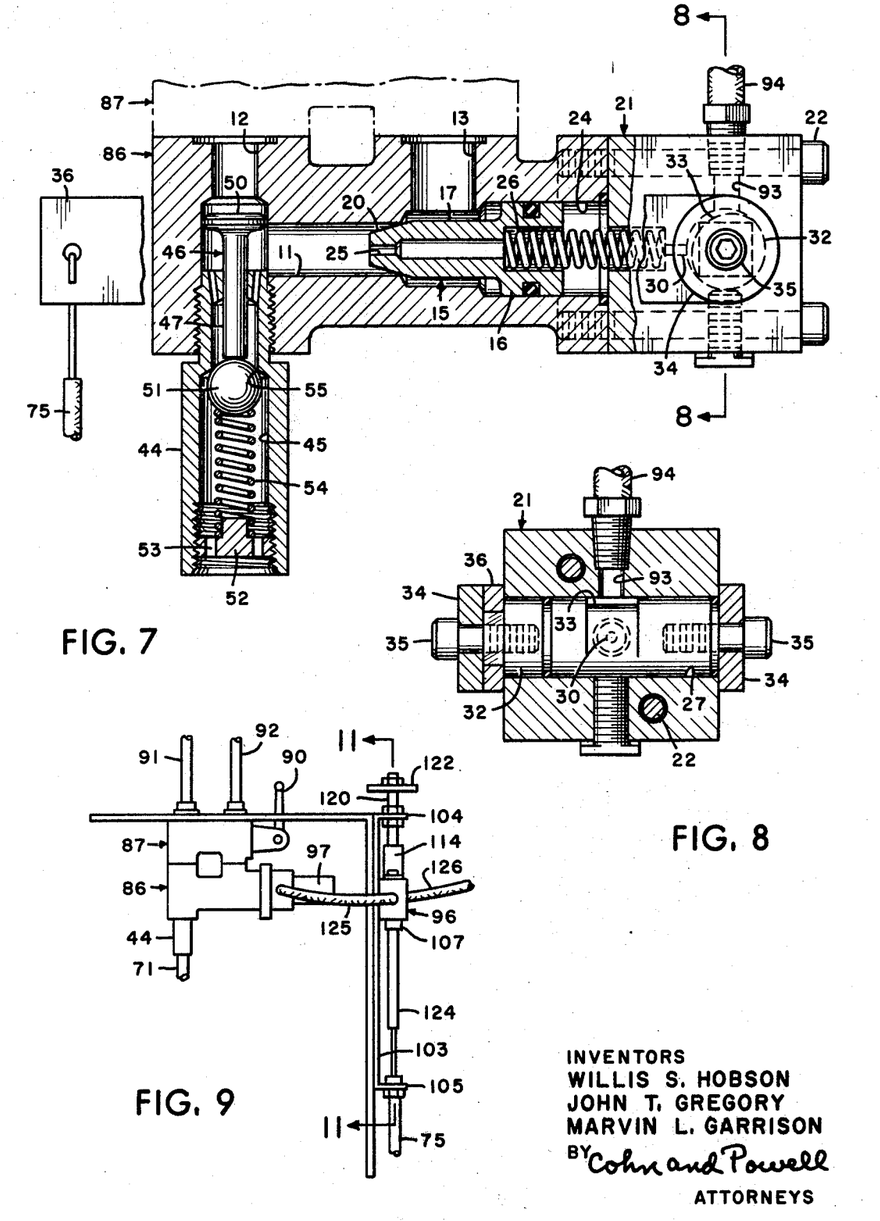
FIG. 7 is an enlarged cross sectional view of the metering valve used in FIG. 6.
FIG. 8 is a cross sectional view as seen along line 8—8 of FIG. 7.
FIG. 9 is a diagrammatic view of a control system utilizing another embodiment of the metering valve with an associated 4-way valve and a separate sensing unit interconnected by external lines.

A modified metering valve 86 is disclosed in FIGS. 7 and 8, while the system in which the metering valve 86 is utilized is illustrated in FIG. 6. The construction of the metering valve 86 (FIGS. 7–8), while differing in details, is closely similar to the metering valve 10 of FIGS. 2–4. Therefore, wherever possible, the same reference numerals will be utilized to indicate corresponding parts. The primary differences reside in the fact that the metering valve 86 is connected to and associated with a four-way valve 87 constituting a switching valve, and that the internal dump passage interconnecting the compartment 24 with the second port 13 is eliminated.

For example, a conventional four-way valve 87 is mounted to the valve body 10 and is adapted to introduce fluid under pressure to either the first port 12 or the second port 13. This four-way control valve 87 includes a control lever 90 that is movable to three distinct positions hereinafter referred to as an automatic position, a neutral position and a manual lift position. This general type of four-way valve is shown in U.S. Patent No. 2,362,339.

As disclosed in FIG. 6, the hydraulic system includes a pair of hydraulic lines 91 and 92 connecting the four-way valve 87 to the reservoir 76. The pump 80 is connected in one of the hydraulic lines 91 to supply fluid under pressure to the four-way control valve 87.

As is best seen in FIGS. 7 and 8, the metering hole 30 is formed in the sensing unit partition 23 to place the unit bore 27 in communication with the body compartment 24. Formed in the side of the sensing unit 21 is a dump passage portion 93 communicating with the bore 27 and aligned with the spool valve recess 33. An external dump passage line 94 interconnects the internal dump passage portion 93 with the hydraulic line 92 leading directly to the reservoir 76. It will be noted that when the spool valve 32 is moved to one position, the spool valve 32 will close the metering hole 30, and thereby prevent flow through the external dump passage line 94. When the spool valve 32 is moved to another position, its recess 33 will open the metering hole 30 and place such hole 30 in direct communication with the internal dump passage portion 93, whereby the fluid from compartment 24 can flow directly through the external dump passage line 94 to the reservoir 76.

When the control lever 90 is located in its automatic position, the control valve 87 will feed fluid under pressure to the first port 12 and the metering valve 86 will operate in exactly the same manner as previously described with respect to the metering valve 10 of FIGS. 2–4.

When the control lever 90 is located in its neutral position or when the hydraulic pump 80 is shut off, fluid flow to the metering valve 86 is terminated. The cutting head 57 will tend to lower, causing a contraction of the ram 62, thereby increasing the fluid pressure in the ram 62 and in the fluid line 71. The fluid in line 71 will try to rush past the ball valve 51 into the chamber 11. This fluid flow together with the loading of spring 54 will cause the ball valve 51 to seat immediately and the pressure in the ram 62 will keep the ball valve 51 seated. As mentioned previously, when the ball valve 51 is seated in this manner, the cutting head 57 is held in a stationary height position. Once the ball valve 51 is seated, it will remain seated until the poppet valve 46 again engages the ball valve 51 and unseats it upon applying fluid pressure in the first port 12. It is seen that ball valve 51 provides a safety lock-out feature in that the ram 62 cannot be moved in either direction until fluid pressure is resumed.

When the control lever 90 is placed into the manual lift position, the four-way control valve 87 is conditioned to introduce fluid under pressure to the second port 13 in FIG. 7. The piston 16 of plunger 15 is of sufficient size so that when fluid under pressure is introduced through the second port 13, the plunger 15 is pushed back so that the valve member 17 moves away from its valve seat 14, thereby allowing fluid under pressure to flow past the valve seat 14 into the chamber 11 between the valve ports 12 and 13. When this fluid under pressure in chamber 11 is exerted on the poppet valve 46, the poppet valve 46 moves to close the first port 12. All of the fluid then channels into the third port 45, opening the ball valve 51 and flowing through the fluid line 71 into ram 62. This exertion of fluid pressure in ram 62 causes an expansion of the ram and causes the cutting head 57 to raise. The head 57 is lifted by the ram 62 until the ram 62 is fully extended or until the control lever 90 is placed in its neutral position or in its automatic position.

When the cutting head 57 is being raised under manual lift conditions, the sensing valve spool is moved to a position in which its recess 33 opens the metering hole 30 so that the fluid in the compartment 24 will flow directly through the external dump passage line 94 to the reservoir 76. Because the pressure in the compartment 24 is reduced, the pressure on the opposite side of the piston being exerted through the second port 13 acts easily to move the plunger 15 in a direction to unseat the valve member 17 from its valve seat 14. The only opposition to this plunger movement is the loading of spring 26, but this loading is quickly and easily overcome.

When the control lever 90 is put into neutral position, the ram 62 will hold the cutting head 57 in a stationary position because of the lock-out feature described previously. However, when the control lever 90 is put into its automatic position, the metering valve will operate under automatic conditions as described previously.

Figures 10, 11:
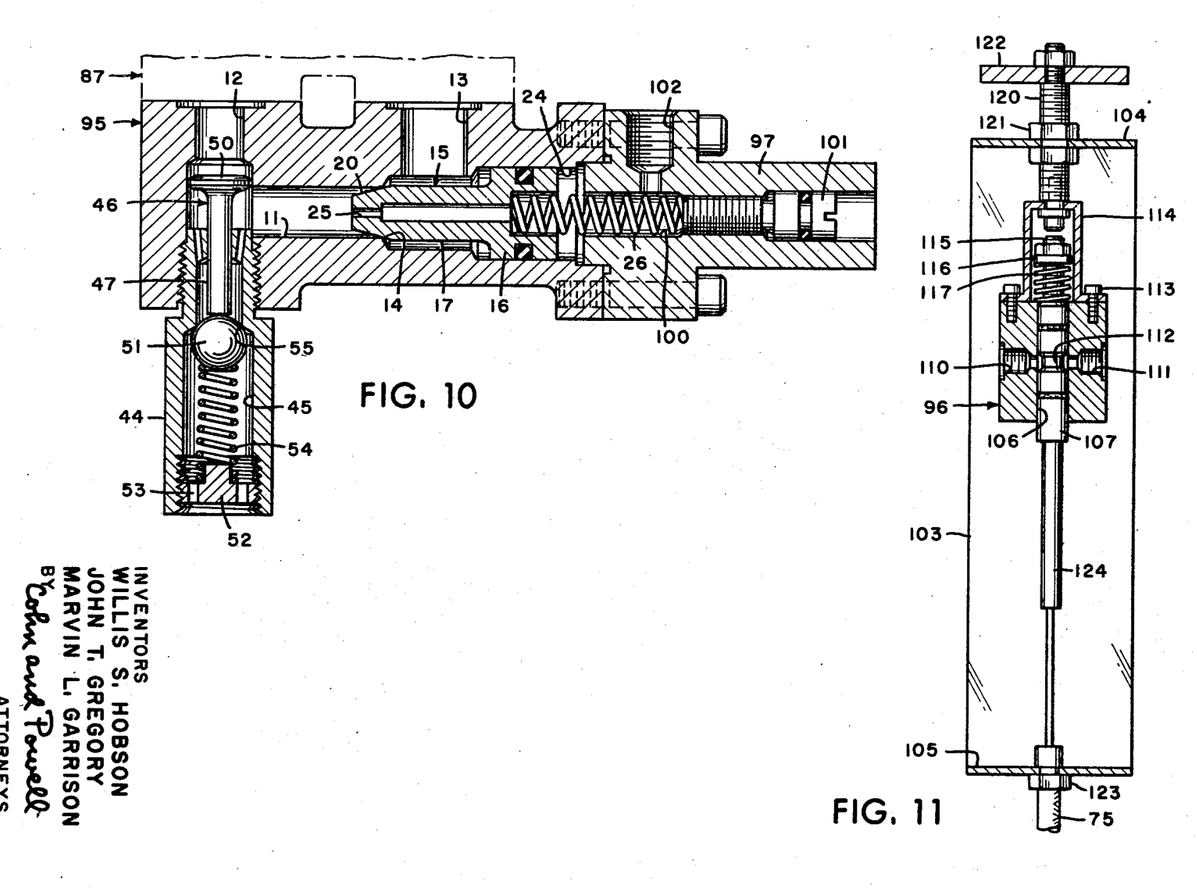
FIG. 10 is an enlarged cross sectional view of the metering valve utilized in FIG. 9.
FIG. 11 is an enlarged cross sectional view as seen along line 11—11 of FIG. 9.

FIG. 10 illustrates a modified embodiment of a metering valve 95 that is utilized with a sensing unit that is not attached to the valve body 10, but is maintained separately therefrom, this sensing unit being illustrated in FIG. 11 and indicated generally by 96. FIG. 9 is a diagrammatic view illustrating the system utilizing the metering valve 95 and sensing unit 96. For clarity, the same reference numerals used above with respect to the other embodiments will be used wherever possible to indicate corresponding parts.

In FIG. 10, a closure 97 is fastened to the valve body 10 by screws 22 to close the open end of chamber 11. This closure 97 provides a compartment 24 at one side of the piston 16 of plunger 15. The closure 97 is provided with a longitudinal bore 100 communicating with the compartment 24, the bore 100 being closed at its open end by an adjustable, threaded plug 101. The compression spring 26 is located in the compartment 24 and in the bore 100, one end of the spring 26 engaging the plug 101 and the other end engaging the plunger 15, the spring 26 tending to urge the plunger in a direction to move the valve member 17 toward its valve seat 14. Upon turning the plug 101 with a suitable tool, such as a screwdriver, the longitudinal position of such plug can be adjusted and thereby change the force of spring 26.

Communicating with the compartment 24 through the bore 100 is an internal dump passage portion 102 formed in the closure 97.

The sensing unit 96 in FIG. 11 is mounted to an elongate, U-shaped bracket 103 having opposed flanges 104 and 105. Formed through the sensing unit 96 is a bore 106 in which a spool valve 107 is reciprocatively mounted. An inlet port 110 is formed in the unit 96 and communicates with bore 106. An outlet port 111 is formed in unit 96 and communicates with bore 106 also. The spool valve 107 is provided with a recess 112 that places the inlet and outlet ports 110 and 111 in communication in one position of the spool valve 107, the spool valve 107 being adapted to close such inlet and outlet ports upon longitudinal sliding movement to another position.

Attached by screws 113 to the sensing unit 96 is a strap 114 providing a channel in which one end 115 of the spool valve 107 is reciprocatively guided. Specifically, the spool end 115 is provided with a nut and washer 116. A compression spring 117 located about the spool end 115 and disposed between the unit 96 and the washer 116 tends to urge the spool valve 107 longitudinally in one direction within its bore 106.

A threaded rod 120 is fixed by nuts 121 to the bracket flange 104, one end of the rod 120 being fixed to the strap 114 while the opposite end of the rod 120 is fixed to an adjusting knob 122 of the combine.

The flexible control cable 75 of the system is fixed by nut 123 to the bracket flange 105, the control cable 75 being fixed to the other end 124 of the spool valve 107. The flexible control cable 75 acts to move the spool valve 107 reciprocatively within the sensing unit 96 to either a position in which its recess 112 interconnects the ports 110 and 111 or to a position in which the spool valve 107 closes such ports 110 and 111.

As is best seen in FIG. 9, the four-way valve 87 is fixed to the combine frame, as is the bracket 103. An external dump passage line 125 interconnects the internal dump passage portion 102 of the metering valve 95 with the inlet port 110 of the sensing unit 96. Another external dump passage line 126 interconnects the outlet port 111 to the reservoir 76 of the system.

When the control lever 90 of the four-way control valve 87 is in its automatic position, the four-way control valve 87 is conditioned to feed fluid under pressure to the first port 12 and is adapted to receive fluid from the metering valve body 10 through the second valve port 13. When the hydraulic pressure is turned off, the fluid pressure existing in the ram 62 acting in conjunction with the spring 54 causes the ball valve 51 to contact its valve seat 55 and close the third port 45, thereby maintaining the cutting head 57 in a stationary position.

When the hydraulic pressure is turned on, fluid under pressure is introduced through the first port 12 causing the poppet valve 46 to open the first port 12. The stem 47 of the poppet valve 46 engages the ball valve 51 and opens the third port 45. The valve member 17 is seated on its valve seat 14 under the action of spring 26 urging the plunger 15 toward the closed position. Assuming that the cutting head 57 is in a raised position relative to the ground, the flexible control cable 75 acting in response to the position of the feelers 73 moves the spool valve 107 to a position in whch the inlet and outlet ports 110 and 111 are interconnected by the spool recess 112, thereby opening the dump passage line interconnecting the metering valve compartment 24 with the reservoir 76. Because the fluid pressure in the compartment 24 is reduced, and the pressure in chamber 11 at the forward end of the valve member 17 is increased, the plunger 15 will move back under the loading of spring 26 so that the valve member 17 moves away from its valve seat 14. The bulk of the fluid under pressure passing into the chamber 11 flows from the first port 12 past the valve member 17 and out of the second port 13 back into the four-way valve 87. Because the ball valve 51 is open, the fluid can flow through the third port 45.

Thus, the cutting head 57 drops under gravity. The feelers 73 engaging the ground operate to shift the spool valve 107 under the action of the flexible control cable 75, as the head 57 approaches the predetermined height position, so that the spool valve 107 closes the inlet and outlet ports 110 and 111 in the sensing unit 96. This action of the spool valve 107 closes the external dump passage line from the metering valve compartment 24 to the reservoir 76. The fluid flowing through the bleed passage 25 in the plunger 15 and into the compartment 24 will increase the pressure on the one side of the piston 16 and will force the plunger 15 in a direction to move the valve member 17 toward its valve seat 14, thereby reducing the flow of fluid out of the second port 13 and consequently channelling more of the fluid flow through the third port 45 into the hydraulic ram 62, thereby causing the ram 62 to lift the head 57.

As the cutting head 57 is raised, the feelers 73 engaging the ground will rotate and will act through the control cable 75 to shift the spool valve 107 within its bore to open the inlet and outlet ports 110 and 111 and thereby open the external dump passage lines 125 and 126 for flow from the compartment 24 to the reservoir 76. Upon this reduction in pressure in the compartment 24, the plunger 15 will move in a direction so that its valve member 17 moves away from its valve seat 14. This action of the plunger 15 causes more of the fluid to pass from the first port 12 to the second port 13. Fluid in the ram 62 and in the fluid line 71 then flows through the third port 45 and into the chamber 11, thereby causing the head 57 to lower.

When the control lever 90 of the four-way control valve 87 is located in its neutral position or when the hydraulic pump 80 is shut off, fluid flow to the metering valve 95 is terminated. The cutting head 57 will tend to lower causing a contraction of the ram 62, thereby increasing the fluid pressure in the ram 62 and in the fluid line 71. The fluid pressure in line 71 and the loading of spring 54 will cause the ball valve 51 to seat on its valve seat 55, thereby retaining the cutting head 57 in a stationary height position. The ball valve 51 will remain seated until the poppet valve 46 unseats it upon applying fluid pressure in the first port 12.

When the control lever 90 of the four-way control valve 87 is placed in the manual lift position, the four-way control valve 87 is conditioned to introduce fluid under pressure through the second port 13 of metering valve 95. This pressure flow through second port 13 on the piston 16 of plunger 15 urges the plunger 15 back in a direction to move the valve member 17 away from its valve seat 14, thereby allowing fluid under pressure to flow past the valve seat 14 into the chamber 11 between the valve ports 12 and 13. When this fluid under pressure in this portion of chamber 11 is exerted on the poppet valve 46, the poppet valve 46 moves to close the first port 12. All of the fluid then channels into the third port 45, opening the ball valve 51 and flowing through the fluid line 71 into the ram 62. This exertion fluid pressure in ram 62 causes an expansion of the ram and causes the cutting head 57 to raise. The head 57 is raised by the ram 62 until the ram 62 is fully extended or until the control lever 90 is placed in its neutral position or in its automatic position.

Figures 12, 13:
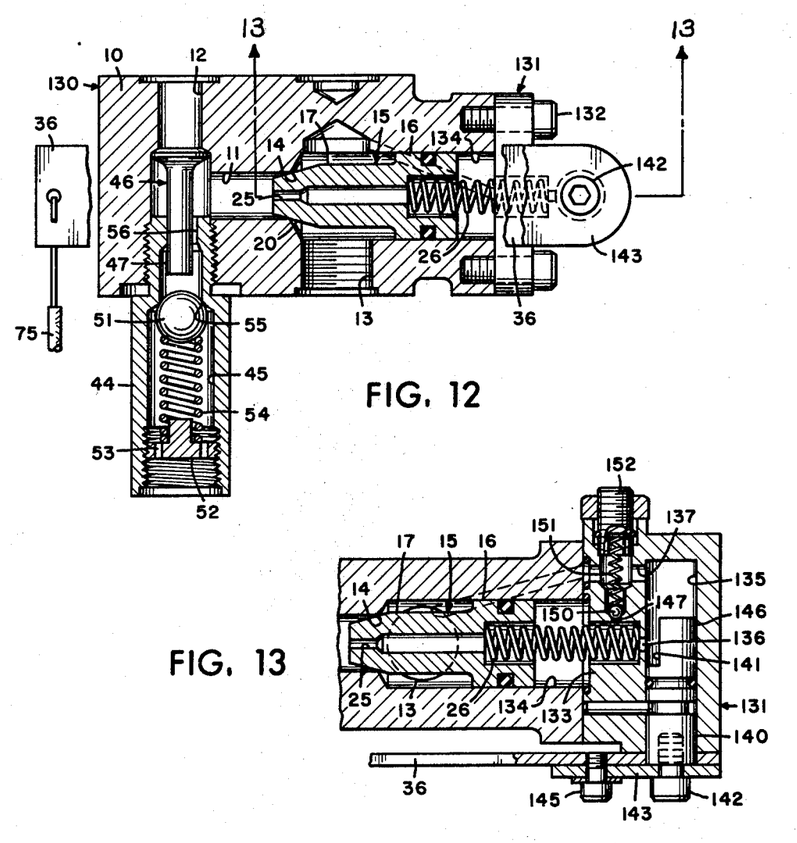
FIG. 12 is a cross sectional view of a modified metering valve utilized in FIG. 1.
FIG. 13 is a fragmentary cross sectional view as seen along line 13—13 of FIG. 12.
Figure 14:
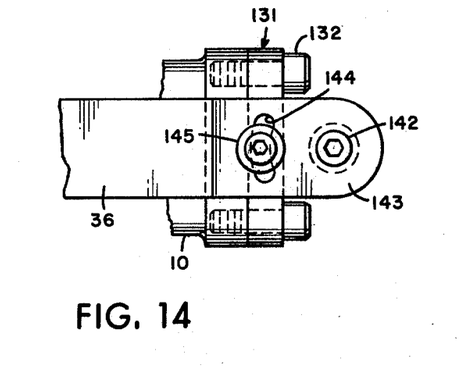
FIG. 14 is a side elevational view of the sensing unit of FIG. 13.

A modified metering valve generally indicated by 130 that may be utilized in the system of FIG. 1 is disclosed in FIGS. 12–14. The construction of the metering valve 130 is somewhat similar to the metering valve 10 of FIGS. 2–4. Therefore, wherever possible, the same reference numerals will be utilized to indicate corresponding parts.

For example, the metering valve 130 includes a valve body 10 having a chamber 11 formed therein, the chamber 11 being open at one end of body 10. Formed in body 10 is a first port 12 communicating with chamber 11. A cooperating second port 13 is formed in body 10 in spaced relation to the first port 12, the second port 13 communicating with chamber 11 toward its open end.

Located in chamber 11 at one side of second port 13 and located between the first and second ports 12 and 13 is a valve seat 14. A plunger 15 is reciprocatively mounted in chamber 11. The plunger 15 includes a piston 16 sliding within the chamber 11 at the opposite side of the second port 13. The plunger includes a reduced valve member 17 formed integrally with the piston 16, the valve member 17 extending across the second port 13 into operative relation with the valve seat 14. The valve member 17 includes a tapered forward end 20 that is adapted to move toward or away from the valve seat 14 upon reciprocation of the plunger 15 to regulate the flow between first and second ports 12 and 13.

A sensing unit 131 is attached to body 10 by screws 132, the sensing unit 131 including a partition 133 closing the open end of body chamber 11 to form a compartment 134 at one side of the piston 16. The plunger 15 is provided with a restricted bleed passage 25 along its longitudinal axis and interconnecting that portion of the chamber on the same side of the valve seat 14 as the first port 12 with the compartment 134. A compression spring 26 is located in the compartment 134, one end of spring 26 engaging the partition 133 and the other end engaging the piston 16, the spring 26 tending to urge the valve member 17 in a direction toward its associated valve seat 14.

Formed transversely in the sensing unit 131 is an incomplete cylindrical bore 135. A small metering hole 136 through the partition 133 interconnects and communicates the compartment 24 with the bore 135, the metering hole 136 constituting a dump passage portion. An internal dump passage portion 137 in the sensing unit 131 and in the valve body 10 interconnects and communicates the second port 13 with the bore 135. The metering hole 136, the bore 135 and the internal passage 137 combine to form and constitute the interval dump passage.

Oscillatively mounted in the bore 135 is a spool valve 140, the periphery of the spool valve 140 being provided with a recess 141 selectively alignable with the metering hole 136 upon oscillation of the spool valve 140 to place the metering hole 136 in direct communication with the bore 135, and hence in communication with the internal dump passage portion 137. An actuating arm 36 is fixed to one end of the spool 140 by fastening screw 142. An external plate 143 is disposed between the actuating arm 36 and the fastening screw 142, the plate 143 including an elongate slot 144 through which another pin 145 extends and interconnects the plate 143 to the actuating arm 36. The slot 144 permits a relative adjustment in the position between the arm 36 and plate 143. Upon movement of the spool valve 140 in one direction, the periphery 146 of such valve will close the metering hole 136, and upon oscillation in the other direction, the recess 141 will open the metering hole 136 and thereby open the dump passage.

Formed internally of the sensing unit 131, and specifically in the partition 133, is a small by-pass port 147 interconnecting that portion of the dump passage 137 formed in partition 133 with the chamber 134. This small by-pass port 147 is closed by a ball check-valve 150. A compression spring 151 urges the ball 150 against its valve seat to close the by-pass port 147. An adjustable plug 152 is threadedly connected to the body of the sensing unit 131 and engages one end of the compression spring 151 whereby to adjust the closing pressure on the ball 150.

During normal operation of the metering valve, the ball check valve 150 closes the by-pass port 147. However, if for any reason, the system becomes jammed such that the metering hole 136 is closed by the periphery 146 of spool valve 140 so that the pressure building up in compartment 134 behind the piston 16 tends to hold the valve member 17 of the plunger 15 closed against valve seat 14, there is a possibility of damage to the control system upon application of pressure through the first port 12. Under these circumstances, upon a predetermined pressure in the first port 12, the ball 150 will open to place the compartment 134 in communication with the dump passage portion 137, whereby to relieve the pressure in the compartment 134 and thereby allow the pressure building up on the nose of the plunger 15 to move the plunger 15 in a direction away from the valve seat 14, and thereby allow the flow from the first port 12 to pass directly into and through the second port 13 for passage back to the reservoir 76. Thus any excessive pressure in the first port 12 is automatically relieved.

Because the pressure existing in the compartment 134 is substantially lower than the pressure existing in the first port 12, the by-pass port 147 need be of only a very small diameter, and the coacting ball check valve 150 need be of a correspondingly small size. The spring 151 is relatively weak. For example, if the pressure existing in the first port 12 and exerted on the nose of the plunger 15 is 1200 p.s.i., the pressure existing in the compartment 134 will be only 400 p.s.i. in view of the relative 3 to 1 surface area of the rear of piston 16 as compared with that of the plunger nose. Therefore, instead of requiring a large check valve and compression spring and large by-pass port to deal with the relatively large pressure conditions existing in the first port 12, there need be only a very small corresponding structure interconnecting the compartment 134 with a dump passage portion 137 of the embodiment of FIGS. 12–14 in view of the substantially reduced pressure conditions.

Threadedly attached to the valve body 10 directly opposite the first port 12 is a tubular casing 44 that constitutes a part of body 10. The casing 44 provides a third port 45 that communicates with the chamber 11, the third port 45 being directly aligned with the first port 12 and being located on the same side of the valve seat 14 as the first port 12, and being located between the first port 12 and the valve seat 14 when considering the flow from the first port 12 to the second port 13.

Reciprocatively mounted in the reduced end of casing 44 is a poppet valve 46. The poppet valve 46 includes a stem 47 that extends into the casing 44 and hence into the third port 45, and which extends into and across chamber 11. The poppet valve 46 includes a head 50 adapted to open and close the first port 12. The head 50 opens the first port 12 under pressure of flow into the first port 12.

A ball valve 51 is resiliently mounted within the casing 44. An adjustable plug 52 is threadedly connected internally of casing 44, the plug 52 being provided with openings 53 communicating with the third port 45. A compression spring 54 is mounted within the casing 44 between the ball valve 51 and plug 52, the spring 54 tending to urge the ball valve 51 against its valve seat 55 to close the third port 45.

When the poppet valve 46 is moved inwardly of the casing 44 upon opening of the first port 12, the stem 47 engages the ball valve 51 and moves the ball valve 51 away from the valve seat 55. The third port 45 receives flow after passage into and through the first port 12, the ball valve 51 under the loading of the spring 54 maintains the poppet valve 46 in position so that the head 50 of such poppet valve is located substantially midway in the chamber 11. A plurality of passages 56 are formed in the front end of casing 44 immediately adjacent the periphery of the stem 47 of poppet valve 46 to provide direct communication of the third port 45 with chamber 11.

The metering valve of FIGS. 12–14 is utilized in the apparatus of FIG. 1. With the hydraulic pressure turned off, the fluid pressure existing in the ram 62 and in the fluid line 71 causes the ball valve 51 to contact its valve seat 55 and close the third port 45, thereby maintaining the cutting head 57 in a stationary position. The plunger 15 is moved in a direction under the action of spring 26 so that the valve member 17 engages its valve seat 14 to close the flow passage between the first and second ports 12 and 13.

When hydraulic pressure is turned on, fluid under pressure is introduced through the first port 12 causing the poppet valve 46 to unseat. As the poppet valve 46 opens the first port 12, the stem 47 engages the ball valve 51 and opens the third port 45. Because the valve seat 14 is closed by the valve member 17, pressure will build up in the chamber 11 and force the plunger 15 to move in a direction to unseat the valve member 17 from seat 14, and thereby open the passage between the first and second ports 12 and 13. The bulk of the fluid under pressure passing into the chamber 11 flows from the first port 12 past the valve member 17 and out the second port 13, and back into the reservoir 76 through the dump line 81. Because the ball valve 51 is open, fluid can flow through the third port 45.

Simultaneously, fluid is flowing through the small bleed passage 25 and into the compartment 134 at one side of piston 16. Because the cutting head 57 is raised, the feelers 73 are rotated in a position so that the control cable 75 has moved the actuating arm 36 in a direction whereby the spool valve 140 is turned to a position in which its recess 141 opens the metering hole 136 and opens the internal dump passage communicating the compartment 134 with the second port 13. Consequently, the pressure in the compartment 134 is reduced to allow the plunger 15 to move in the direction in which the valve member 17 unseats from its valve seat 14.

The cutting head 57 drops under gravity to a predetermined height above the ground. As the cutting head 57 approaches this predetermined height position, the feelers 73 engaging the ground operate through the control cable 75 to swing the actuating arm 36 in a direction to turn the spool valve 140 to a position in which the periphery 146 of the spool valve 140 closes the metering hole 136, and thereby closes the internal dump passage interconnecting the compartment 134 with the second port 13. When the metering hole 136 is closed, the fluid moving through the bleed passage 25 will build up a pressure within the compartment 134 and create a force on the one side of the piston 16 which cooperates with the loading of spring 26 to move the plunger 15 in a direction to move the valve member 17 toward its valve seat 14, thereby reducing the flow of fluid out of the second port 13 and consequently channeling more of the fluid flow through the third port 45 so that the ram 62 lifts the head 57.

As the cutting head 57 is raised, the feelers 73 engaging the ground will rotate and act through the control cable 75 and actuating arm 36 to turn the spool valve 140 in the opposite direction whereby the spool recess 141 will again open the metering hole 136 in order to allow the fluid in compartment 134 to be exhausted directly to the second port 13 through the internal dump passage. Because the pressure in compartment 134 is reduced, the plunger 15 will move in a direction so that the valve member 17 moves away from its valve seat 14. This action of plunger 15 causes more of the fluid to pass from the first port 12 to the second port 13 and thereby causes a pressure drop in the chamber 11. Fluid in the ram 62 and in the fluid line 71 then flows through the third port 45 into the chamber 11, thereby causing the head 57 to lower.

Although the invention has been described by making detailed reference to several embodiments, such detail is to be understood in an instructive, rather than in any restrictive sense, many variants being possible within the scope of the claims hereunto appended.

We claim as our invention:

1. A metering valve apparatus comprising:
   (a) a body provided with a chamber therein, and provided with first and second ports communicating with the chamber,
   (b) a valve seat in the chamber at one side of the second port between the first and second ports,
   (c) a metering plunger in the chamber and including a first valve means movable toward or away from the valve seat to regulate flow of circulating fluid between the first and second ports,
   (d) the body being provided with a third port communicating with the chamber on the same side of the the valve seat as the first port,
   (e) a second valve means adapted to open the first and third ports under pressure of flow through the first port,
   (f) the plunger including a piston at the other side of the second port,
   (g) means providing a compartment at one side of the piston,
   (h) means providing a bleed passage interconnecting the chamber on the same side of the valve seat as the first port with the compartment,
   (i) means providing a dump passage interconnecting the compartment with the second port, the dump passage including a small metering hole,
   (j) a spool valve oscillatively mounted in the body for opening and closing the metering hole selectively and automatically to regulate flow through the dump passage and through the compartment, and
   (k) resilient means adapted to urge the first valve means toward the valve seat to assure closure upon stoppage of pressure flow and to assist closure when the pressure builds up in the compartment as the spool valve closes the metering hole.

2. A metering valve apparatus as defined in claim 1, in which:
   (l) the body is provided with a by-pass passage interconnecting the first port with the second port and by-passing flow around the valve seat, and
   (m) a by-pass valve in the by-pass passage closes the passage yet opens upon excess pressure in the first port.

3. A metering valve apparatus as defined in claim 2, which:
   (n) the by-pass valve is a check valve.

4. A metering valve apparatus as defined in claim 1 in which:
(l) the spool valve includes a recessed portion in its side, the spool valve selectively closing the metering hole and the recessed portion selectively opening the hole upon oscillation to regulate flow the dump passage,
(m) means is connected to one side of the spool valve for oscillating the spool valve to open or close the metering hole, and
(n) the spool valve is reversible endwise so that the last said means oscillates the spool valve in the opposite direction respectively to close or open the metering hole.

5. A metering valve apparatus as defined in claim 1, in which:
(l) a switching valve is connected to the first and second ports,
(m) a feed line and a dump line are connected to the switching valve, the switching valve selectively connecting the feed and dump lines with either the first or second ports,
(n) said second valve means being further adapted to close the first port while opening the third port upon the introduction of fluid into the second port from said switching valve,
(o) the means providing the dump passage interconnects the compartment with the dump line, and
(p) the sensing valve regulates flow through the dump passage from the compartment to the dump line.

6. A metering valve apparatus as defined in claim 5, in which:
(q) the dump passage includes an internal dump passage portion connected to the compartment, and an external dump passage portion connecting the internal dump passage portion to the dump line.

7. In a mechanism maintaining a substantially constant cutting height for the cutting head of a combine:
(a) an adjustably mounted head,
(b) a one-way fluid ram connected to the head,
(c) feelers carried by the head to detect any variation in round contour below the head,
(d) a metering valve apparatus comprising a body provided with a chamber therein, and provided with first and second ports communicating with the chamber,
(e) a metering plunger providing first valve means in the chamber at one side of the second port and between the first and second ports for regulating flow of circulating fluid therebetween,
(f) the body being provided with a third port communicating with the chamber on the same side of the first valve means as the first port,
(g) a second valve means opening or closing the first and third ports,
(h) means connecting the third port to the ram,
(i) a feed line selectively introducing fluid under pressure through the first port, and a dump line selectively connected to the second port,
(j) the second valve means opening the first and third ports upon introducing fluid into and through the first port so that the ram raises the head when the first valve means is moved toward a closed position,
(k) the first valve means including a piston in the chamber at the other side of the second port,
(l) means providing a compartment at one side of the piston,
(m) means providing a bleed passage communicating the chamber between the first and second ports with the compartment,
(n) means providing a dump passage communicating the compartment with the second port, and
(o) a sensing valve operatively connected to the ram and selectively and automatically regulating flow through the dump passage in response to feeler movement, and
(p) resilient means in the compartment tending to urge the first valve means toward the closed position.

8. A mechanism as defined in claim 7, in which:
(q) a valve seat is provided in the chamber at one side of the second port between the first and second ports, the first valve means being movable toward or away from the valve seat to regulate flow between the first and second ports,
(r) the resilient means engages the plunger,
(s) the valve body is provided with a by-pass passage interconnecting the first port with the second port and by-passing flow about the valve seat, and
(t) a by-pass valve is in the by-pass passage closing the passage yet opening upon excess pressure in the first port.

9. A mechanism as defined in claim 7, in which:
(q) a switching valve is connected to the first and second ports,
(r) the feed and dump lines are connected to the switching valve, and the switching valve selectively connects the feed and dump lines with either the first or second ports,
(s) the second valve means closes the first port while opening the third port upon introducing fluid into the second port, and
(t) the means providing the dump passage interconnects the compartment to the dump line, and
(u) the sensing valve regulates flow through the dump passage from the compartment to the dump line.

10. A mechanism as defined in claim 7, in which:
(q) the dump passage includes a small metering hole,
(r) the sensing valve is a spool valve oscillatively mounted in the body, the spool valve includes a recess portion in its side and a peripheral portion, the peripheral portion selectively closing the metering hole and the recess portion selectively opening the hole upon oscillation of the spool valve to regulate flow through the dump passage, and
(s) means is connected between one side of the spool valve and said feelers for oscillating the spool valve in response to feeler movement,
(t) the spool valve is reversible endwise so that the last said means oscillates the spool valve in the opposite direction respectively to close or open the metering hole.

References Cited

UNITED STATES PATENTS

| | | | |
|---|---|---|---|
| 1,129,533 | 2/1915 | Williams | 251—43 |
| 2,855,949 | 10/1958 | Sterner et al. | 251—43 X |
| 3,012,752 | 12/1961 | Buck | 251—309 |
| 3,329,166 | 7/1967 | Kiernan | 251—309 X |
| 3,314,643 | 4/1967 | Sachnik | 251—309 |
| 226,224 | 4/1880 | Demarest | 137—413 |
| 2,360,816 | 10/1944 | Pasco | 251—33 |
| 2,699,316 | 1/1955 | Mosher | 251—43 |
| 3,088,264 | 5/1963 | Sallee | 56—210 |
| 3,171,432 | 3/1965 | Bard | 251—43 |
| 3,267,653 | 8/1966 | Dawalt et al. | 56—11 |

RUSSELL R. KINSEY, Primary Examiner

P. A. RAZZANO, Assistant Examiner

U.S. Cl. X.R.

137—413, 625.6; 251—43